United States Patent
Derrick et al.

(10) Patent No.: US 6,336,182 B1
(45) Date of Patent: Jan. 1, 2002

(54) SYSTEM AND METHOD FOR UTILIZING A CONDITIONAL SPLIT FOR ALIGNING INTERNAL OPERATION (IOPS) FOR DISPATCH

(75) Inventors: John Edward Derrick, Round Rock; Lee Evan Eisen, Austin; Paul Joseph Jordan, Austin; Robert William Hay, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/263,668

(22) Filed: Mar. 5, 1999

(51) Int. Cl.[7] .................................................. G06F 9/00
(52) U.S. Cl. ................................... 712/204; 712/23
(58) Field of Search .......................... 712/23, 24, 204, 712/215, 213

(56) References Cited

U.S. PATENT DOCUMENTS

| | | | | |
|---|---|---|---|---|
| 5,742,783 A | * | 4/1998 | Azmoodeh et al. | 712/212 |
| 5,930,508 A | * | 7/1999 | Faraboschi et al. | 395/706 |
| 6,044,450 A | * | 3/2000 | Tsushima et al. | 712/24 |
| 6,092,176 A | * | 7/2000 | Iadonato et al. | 712/23 |
| 6,122,722 A | * | 9/2000 | Slavenburg | 712/24 |
| 6,170,051 B1 | * | 1/2001 | Dowling | 712/225 |

* cited by examiner

*Primary Examiner*—Larry D. Donaghue
(74) *Attorney, Agent, or Firm*—Sawyer Law Group LLP; Anthony V. S. England

(57) ABSTRACT

A method and system for aligning internal operations (IOPs) for dispatch are disclosed. The method and system comprise conditionally asserting a predecode based on a particular dispatch slot that an instruction is going to be placed. The method and system further include using the information related to the predecode to expand an instruction into at least one dummy operation and an IOP operation whenever the instruction would not be supported in the particular dispatch slot.

5 Claims, 7 Drawing Sheets

| BSFL | Meaning |
| --- | --- |
| 0000 | Normal |
| 0001 | Group Ending Instruction |
| 0010 | Group Beginning Instruction (First) |
| 0011 | Only |
| | |
| 0100 | Split |
| 0101 | Split and Group Ending |
| 0110 | Split and Group Beginning |
| 0111 | Split and Only |
| | |
| 1000 | Conditional Branch |
| 1001 | Unconditional Branch |
| 1010 | -- |
| 1011 | -- |
| | |
| 1100 | Microcode -     A |
| 1101 | -- |
| 1110 | -- |
| 1111 | -- |

FIG. 5

| Original Instructions | IOPs |
|---|---|
| div | nop |
| mult | div |
| mult | mult |
| mult, | ----, |
| div | ---- |
| div | mult |
| div | ---- |
| mult, | mult, |
| | nop |
| | div |
| | ---- |
| | div, |
| | ---- |
| | div |
| | mult. |

FIG. 8

SYSTEM AND METHOD FOR UTILIZING A CONDITIONAL SPLIT FOR ALIGNING INTERNAL OPERATION (IOPS) FOR DISPATCH

CROSS-REFERENCE TO RELATED APPLICATIONS

The present application is related to applications Ser. No. 09/263,663, entitled "A Method and System for Optimizing the Fetching of Dispatch Groups in a Superscalar Processor", filed Mar. 5, 1999, still pending; Ser. No. 09/263,667, entitled "An Instruction Buffer Arrangement for a Superscalar Processor", filed Mar. 5, 1999, still pending; Ser. No. 09/263,669, still pending, entitled "A Simplified Method to Generate BTAGs in a Decode Unit of a Processing System", filed Mar. 5, 1999; Ser. No. 09/263,664, still pending, entitled "Decode Scheme for the Optimization of Accessing Constrained or Volatile Storage", filed Mar. 5, 1999; Ser. No. 09/263,666, entitled "Destructive Operation Optimization for Operations Which Modify Partial Datums", filed Mar. 5, 1999 now abandoned; and Ser. No. 09/263,670, entitled "Fast Microcode/Branch Selector Scheme", filed Mar. 5, 1999, still pending.

FIELD OF THE INVENTION

The present invention relates generally to a superscalar processor and more particularly to the decode and routing of internal instructions to an asymetrical dispatch bus (that is not all instructions can be decoded/dispatched/executed for each and every slot) in such a processor.

BACKGROUND OF THE INVENTION

Superscalar processors employ aggressive techniques to exploit instruction-level parallelism. Wide dispatch and issue paths place an upper bound on peak instruction throughput. Large issue buffers are used to maintain a window of instructions necessary for detecting parallelism, and a large pool of physical registers provides destinations for all of the in-flight instructions issued from the window beyond the dispatch boundary. To enable concurrent execution of instructions, the execution engine is composed of many parallel functional units. The fetch engine speculates past multiple branches in order to supply a continuous instruction stream to the decode, dispatch and execution pipelines in order to maintain a large window of potentially executable instructions.

The trend in superscalar design is to scale these techniques: wider dispatch/issue, larger windows, more physical registers, more functional units, and deeper speculation. To maintain this trend, it is important to balance all parts of the processor since any bottlenecks diminish the benefit of aggressive techniques.

Instruction fetch performance depends on a number of factors. Instruction cache hit rate and branch prediction accuracy have been long recognized as important problems in fetch performance and are well-researched areas.

Modem microprocessors routinely use a plurality of mechanisms to improve their ability to efficiently fetch past branch instructions. These prediction mechanisms allow a processor to fetch beyond a branch instruction before the outcome of the branch is known. For example, some mechanisms allow a processor to speculatively fetch beyond a branch before the branch's target address has been computed. These techniques use run-time history to speculatively predict which instructions should be fetched and eliminate "dead" cycles that might normally be wasted. Even with these techniques, current microprocessors are limited in fetching instructions during a clock cycle. As superscalar processors become more aggressive and attempt to execute many more instructions per cycle, they must also be able to fetch many more instructions per cycle.

High performance superscalar processor organizations divide naturally into an instruction fetch mechanism and an instruction execution mechanism. The fetch and execution mechanisms are separated by instruction issue buffer(s), for example, queues, reservation stations, etc. Conceptually, the instruction fetch mechanism acts as a "producer" which fetches, decodes, and places instructions into a reorder buffer. The instruction execution engine "prepares" instructions for completions. The completion engine is the "consumer" which removes instructions from the buffer and executes them, subject to data dependence and resource constraints. Control dependencies (branches and jumps) provide a feedback mechanism between the producer and consumer.

As instruction fetch decode and dispatch pipelines become wider, it becomes important to optimize the translation from the complex instruction set with a large amount of implicit information to an explicit instruction set that does not require the use of architected registers. This is particularly true in situations where the internal instructions do not have a direct one to one relationship to the external instructions. This is typically done to facilitate faster cycle times, simplify design, or reduce the execution and/or register resources required for that instruction's execution. Additionally, not all instructions may be executed in an early dispatch slot due to constraints on read/write ports into the register files, constraints on the amount of logic that can be used for functional units, and other cost/benefit tradeoffs. As dispatch widths become wider it becomes prohibitively expensive in both area and timing to implement all functions for all slots, therefore it is necessary to direct decoded instructions to the proper dispatch slots. However, for aggressively decomposed internal instruction sets this mechanism must already exist to allow for one-to-one, one-to-two, and one-to-many types of instruction decoding and expansion. Accordingly, a need exists for allowing instructions to be routed to the proper slots without constricting the operation of the processor. The present invention addresses such a need.

SUMMARY OF THE INVENTION

A method and system for aligning internal operations (IOPs) for dispatch are disclosed. The method and system comprise conditionally asserting a predecode based on a particular dispatch slot that an instruction is going to be placed. The method and system further include using the information related to the predecode to expand an instruction into at least one dummy operation and an IOP operation whenever the instruction would not be supported in the particular dispatch slot.

BRIEF DESCRIPTION OF THE DRAWINGS

FIG. 5 illustrates a table which maps the above-identified BSFL code to a particular type of instruction.

FIG. 8 illustrates an instruction decode sequence in accordance with the present invention.

DETAILED DESCRIPTION OF THE INVENTION

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A superscalar processor includes a number of stages, such as the following, in the processor pipeline. In a typical first stage, referred to as an instruction fetch stage, an instruction is fetched from memory or associative memory structure, each stage including one or more pipelines. Then, in decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

Figure 1:
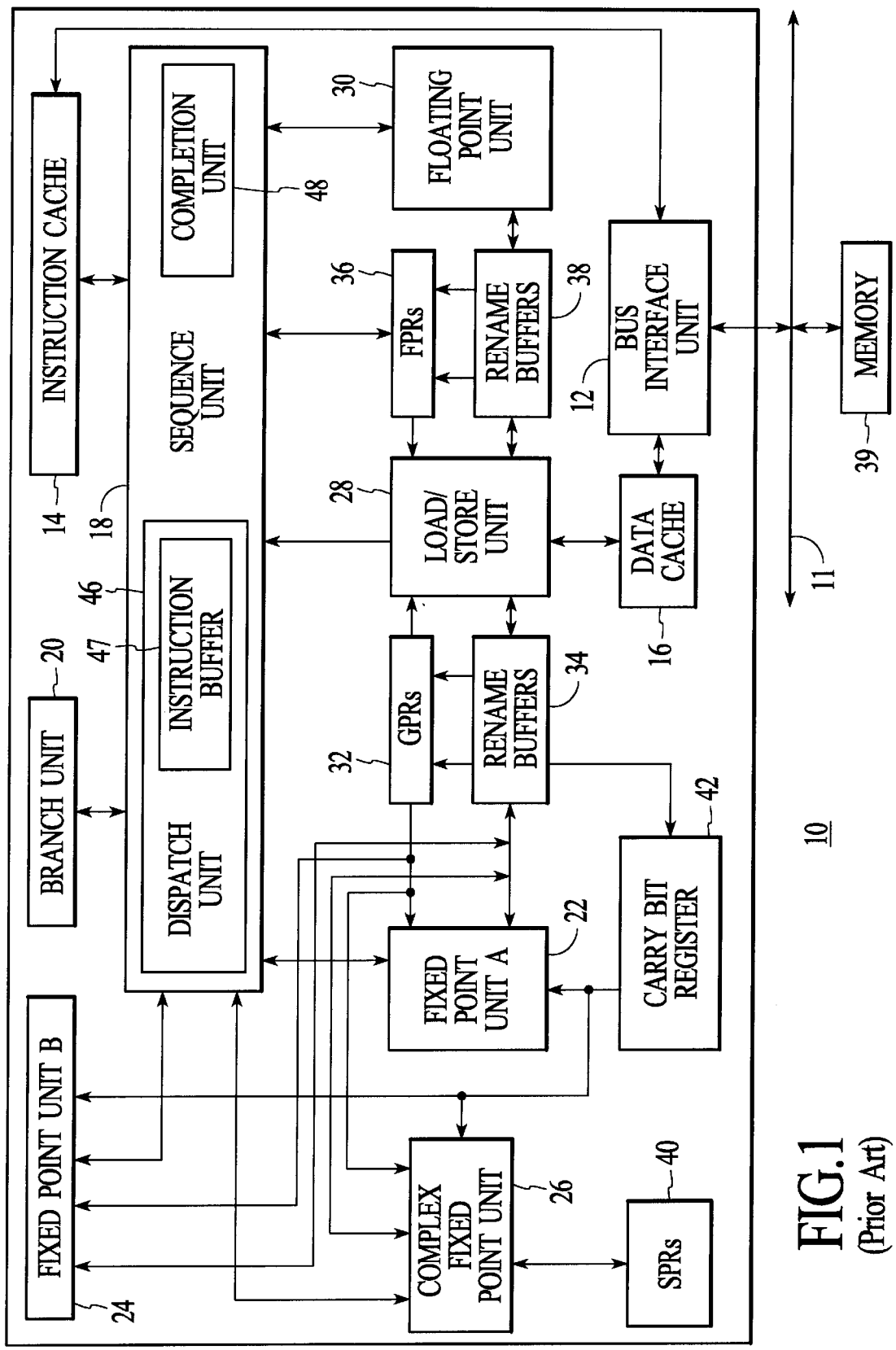
FIG. 1 is a block diagram of a conventional superscalar processor.

FIG. 1 is a block diagram of a conventional superscalar processor 10. As shown, the superscalar processor 10 typically include a system bus 11 connected to a bus interface unit ("BIU") 12. BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

As is seen, the above-identified processor utilizes rename buffers and special purpose registers (SPRs) as a rename pool to keep track of the instructions. This use of a rename pool adds considerable complexity to the superscalar process, particularly as instructions become wider. To index instructions properly, it becomes important to optimize the translation from the complex instruction set with a large amount of implicit information to an explicit instruction set that does not require the use of architected registers. This is particularly true in situations where the internal instructions do not have a direct relationship to the external instructions. Hence, to index instructions properly, it is sometimes important to break those instructions into two instructions or several instructions that may not have a direct relationship to the original instruction to allow for faster execution of such instructions. Accordingly, a unique superscalar processor is provided which removes the rename buffering scheme and replaces it with a rename mapping arrangement.

Figure 2:
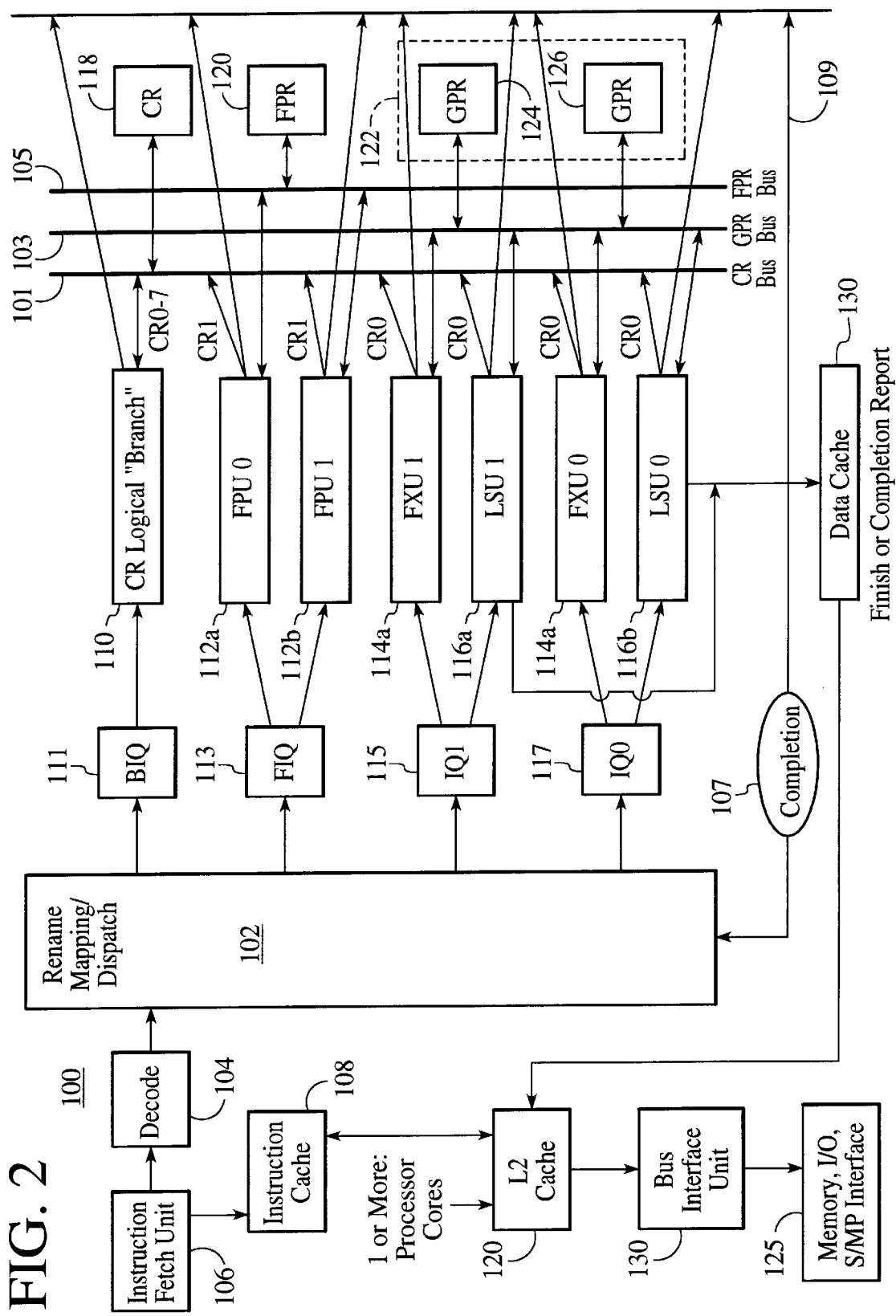
FIG. 2 is a block diagram of a superscalar processor in accordance with the present invention.
Figure 3:
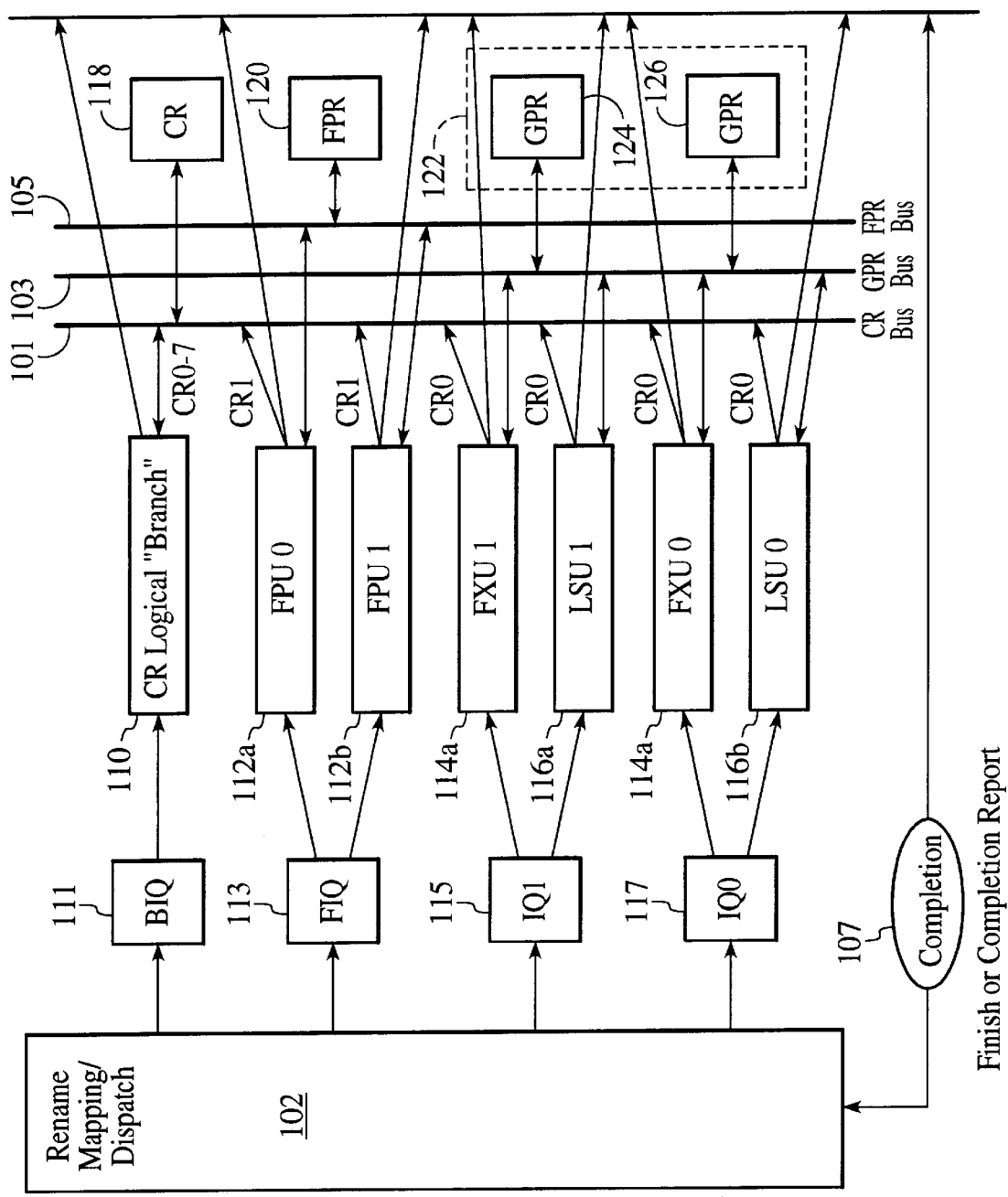
FIG. 3 is an enlarged block diagram illustrating certain portions of the superscalar processor of FIG. 2.

FIG. 2 is a simple block diagram of a superscalar processor 100 in accordance with the present invention. FIG. 3 is an enlarged block diagram illustrating certain portions of the superscalar processor of FIG. 2. The processor includes an instruction fetch unit (IFU) 106 which provides signals to a decode unit 104 which utilizes a rename mapping structure 102. That rename mapping structure 102 provides information directly to issue queues 111–117. The issue queues 111, 113, 115 and 117 in turn feed the execution units 110, 112a–b, 114a–b, and 116a–b.

Instruction cache 108 stores instructions received from the IFU 106. Data cache 130 receives data from the execution units 110–116. A level 2 (L2) cache 120 is utilized to store data and instructions from the data cache 130 and the instruction cache 108. The processor 100 includes a bus interface unit (BIU) 130 which passes information between the L2 cache 120 and the peripheral device interface 125 (i.e., memory, i/o device, mp).

In this embodiment, the branch issue queue (BIQ) 111 provides information to the condition register (CR) logical or branch unit 110. The floating point issue queue (FIQ) 113 provides information to the two floating point units (FPUs) 112a and 112b. Issue queue (IQ) 115 provide information to fixed point unit (FXU) 114a and load/store unit (LSU) 116. IQ 117 provides information to FXU 114b and LSU 116b. Although the issue queues are arranged in the above-identified manner, one of ordinary skill in the art readily recognizes, that the issue queues can be arranged in a different manner and that arrangement would be within the spirit and scope of the present invention.

Conditional register 118 provides and receives information from a CR bus 101. Floating point architectural registers (FPRs) 120 provide and receive information from a FPR bus 105. General purpose registers (GPRs) 124 and 126 provide and receive information from a GPR bus 103. Completion unit 107 provides information to rename mapping 102 via a completion bus 109.

Branch unit 110 provides and receives information via the CR bus 101 utilizing in a preferred embodiment conditional registers 0–7 (CR0–7). FPU 112a and FPU 112b provides information to CR 118 via CR bus 101, utilizing in a preferred embodiment conditional register 1. FPU 112a and 112b also receive and provide information from and to FPR pool 120 via FPR bus 105. FXU 114a, FXU 114b, LSU 116a, LSU 116b output results to CR 118 via CR bus 101, utilizing in a preferred embodiment, conditional register 0. FXU 141a, FXU 146, LSU 116a and LSU 116b also receive and provide information from and to GPR pool 122 via GPR bus 103. GPR pool 122 in a preferred embodiment is implemented utilizing a shadow GPR arrangement in which there are two GPRs 124 and 126. All of the execution units 110–116 provide results to the completion unit 107 via completion bus 109.

Accordingly, the processor in accordance with the present invention, increased throughput at higher instruction rates can be accomplished through an efficient accessing and translating of the instruction set associated with the processor.

To take full advantage of the operation of the processor 100 several features of the processor are optimized to allow for wider instruction fetches and dispatches while minimizing cycle time and the like. The instruction cache 108 fetches very wide data, for example, 8 instructions per cycle. In order to achieve the highest possible frequency the instruction cache 108 does not align the instruction data based upon the starting address.

In accordance with the present invention, an instruction buffer 300 is provided which can form dispatch groups spanning fetch boundaries while minimizing control complexity and wiring congestion within the processor. The instruction buffer, which in a preferred embodiment allows up to eight instructions to be loaded per cycle, any aligned group of four empty entries to be compressed out of the queue is within the decode unit 104, and allows advancing the buffer either zero entries, four entries, or eight entries per cycle (a fractional portion of the fetch width).

An example of this type of instruction buffer is described in copending U.S. patent application Ser. No. 09/263,667, entitled "An Instruction Buffer Arrangement for a Superscalar Processor," assigned to the assignee of this application and filed on even date herewith and is incorporated by reference herein.

Figure 4:
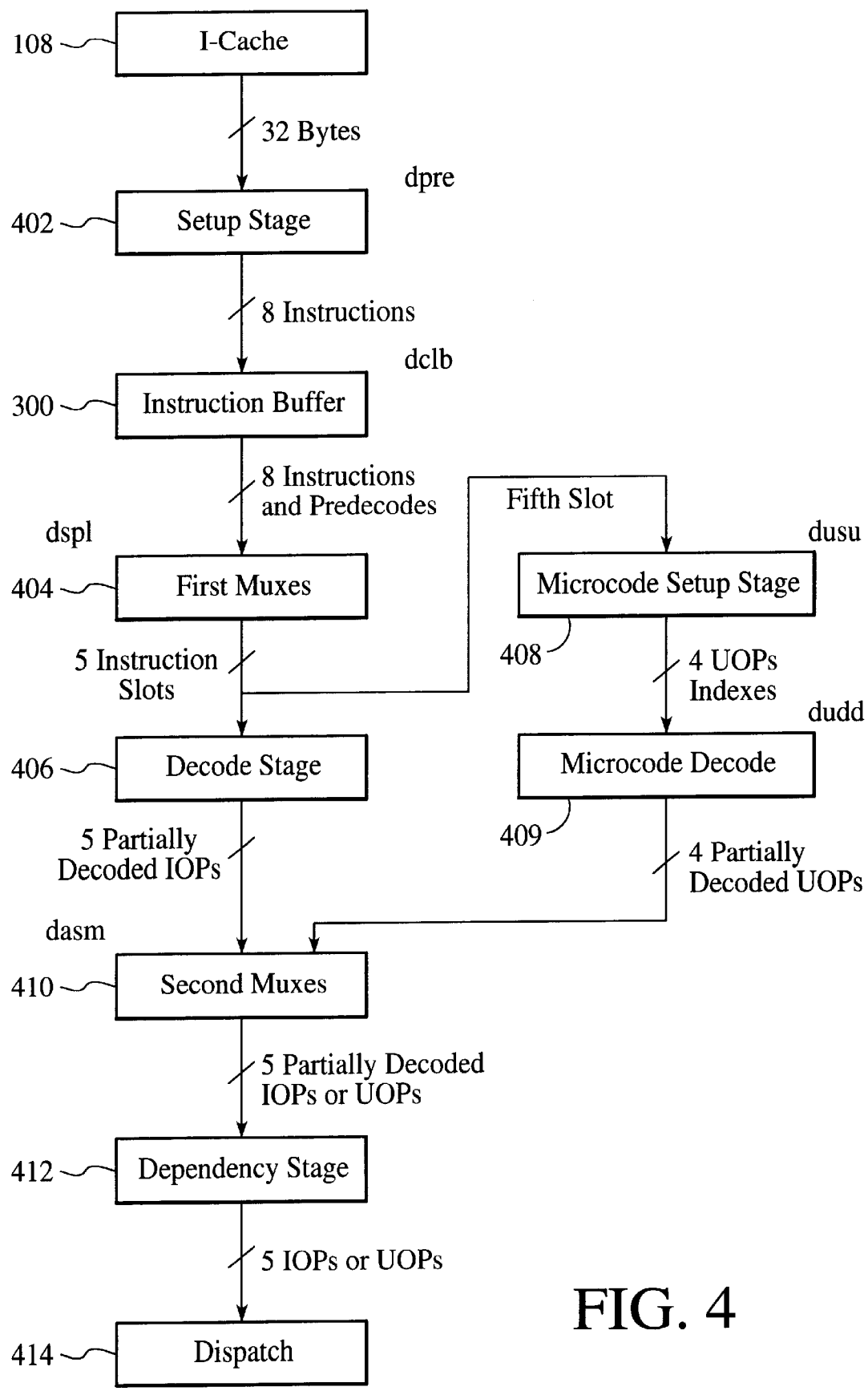
FIG. 4 is a diagram of an instruction decode unit dataflow in accordance with the present invention.

FIG. 4 is a diagram of an instruction decode unit dataflow 400 in accordance with the present invention. The instruction cache 100 provides a plurality of bytes (32 bytes) to a setup stage 402, in this case an eight way setup stage. The setup stage 402 is utilized to calculate the routing controls, provide microcode comparison and a conditional split comparison. Instruction buffer 300 provides instructions and the predecode bits.

In accordance with the present invention, the predecode information is provided below as a BSFL code where:
- B—Branch: (if L='1' it is an unconditional branch, otherwise it is a conditional branch)
- S—Split: (The instruction will form two IOPs)
- F—First: (The instruction must occupy the first decode slot)
- L—Last: (No instruction can follow this instruction in the group)

FIG. 5 illustrates a table which maps the above-identified BSFL code to a particular type of instruction.

Referring back to FIG. 4, the instructions and predecode bits in turn are provided to a first multiplexer 404 (typically 8 to 1) to provide a plurality of instruction slots. The plurality of instruction slots are provided to a decode stage 406. The last of the instruction slots are provided to the microcode setup stage 408, in a manner which will be explained later. The branch instructions and microcode instruction are provided by the last of the instruction slots.

The decode stage 406 provides a plurality of partially decoded internal operations (IOPs). These partially decoded IOPs are provided to a second multiplexer 410.

The microcode decode stage 409 provides a plurality of partially decoded microcode operations (UOPs). These partially decoded UOPs are also provided to the second multiplexer 410. The second multiplexer 410 receives the output of the microcode pipeline and brings it back into the pipeline of the rest of the instruction stream. Then, partially decoded IOPs and UOPs are output from the second multiplexer 410 in program order. The multiplexer 410 is controlled via a state machine arbiter function (not shown).

At this point all the data needed has been assembled for an IOP. These partially decoded IOPs are then provided to the dependency stage 412. The dependency stage 412 merges the parts of the original instruction (i.e., indices, immediate data values, etc.) into the partially decoded IOPs or UOPs. The dependency stage 412 in a preferred embodiment comprises a plurality of multiplexer and control logic that merges the dependency information with IOPs or UOPs. In the dependency stage all of the dependencies are resolved and the fully decoded IOPs or UOPs are provided to the dispatch stage 414.

In a processor which requires instructions to be decomposed into a sequence of instructions due to a limited number of register read and write ports, operations which use more than the available number of operands must be decomposed into multiple instructions.

In some cases, an operand defined for the instruction may be used more than once. If this results in an adequate reduction in the number of register ports required, the instruction can conditionally be decoded without expansion whenever this condition occurs. This special case can be detected and used to inhibit instructions from expanding.

The distribution of functional unit types is not uniform across most modern microprocessor dispatch busses. Data flow to direct instructions to the proper functional units can be very costly in terms of wiring and cycle time. If a processor already implements instruction expansion, 1-to-n split of instructions (especially 1-to-2 expansion) this capability can be used to eliminate any added complexity.

Conditional Microcode

Conditional microcode is utilized in such a processor to provide certain information. As the term "conditional" indicates, it is not known ahead of time whether a particular instruction is microcode or not and therefore oftentimes that instruction is routed as an IOP. However, there are conditions in which it could be easily determined that microcode would not have to be routed as an IOP, and could be split into two instructions.

Figure 6:
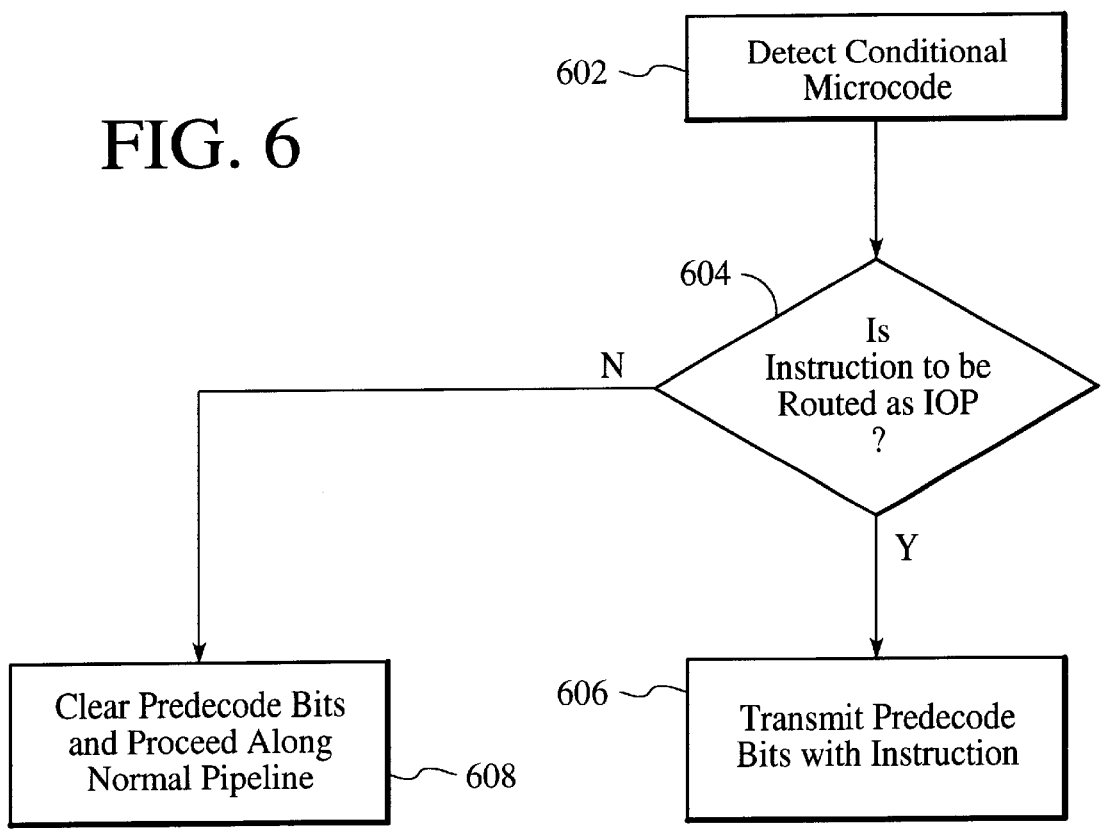
FIG. 6 is a flow chart which illustrates the operation of the mechanism.

A mechanism is located in the setup stage 402 for detecting if a particular conditional microcode instruction needs to be generated as an IOP or whether in fact it can be provided to a different dispatch slot and proceed down the normal pipeline. FIG. 6 is a flow chart which illustrates the operation of the mechanism. Accordingly, through this mechanism, the mechanism can clear from the predecode bits, thereby allowing for the processor execute instructions more efficiently.

First, a conditional microcode instruction is detected, via step 602. Next, it is determined if the instruction is to be routed as an internal operation (IOP), via step 604. If the instruction is to be routed as an IOP then allow the associated predecode bits to be transmitted with the instruction, via step 606. If on the other hand, the microcode instruction is not an IOP, then the instruction can proceed down the normal pipeline by clearing the encoding of the predecode bits, via step 608. In so doing, the instructions can proceed in a normal fashion thus improving performance of the processor when the microcode instruction is not an IOP.

Use of Conditional Split for Alignment of IOPs to Specific Dispatch Slots

Figure 7:
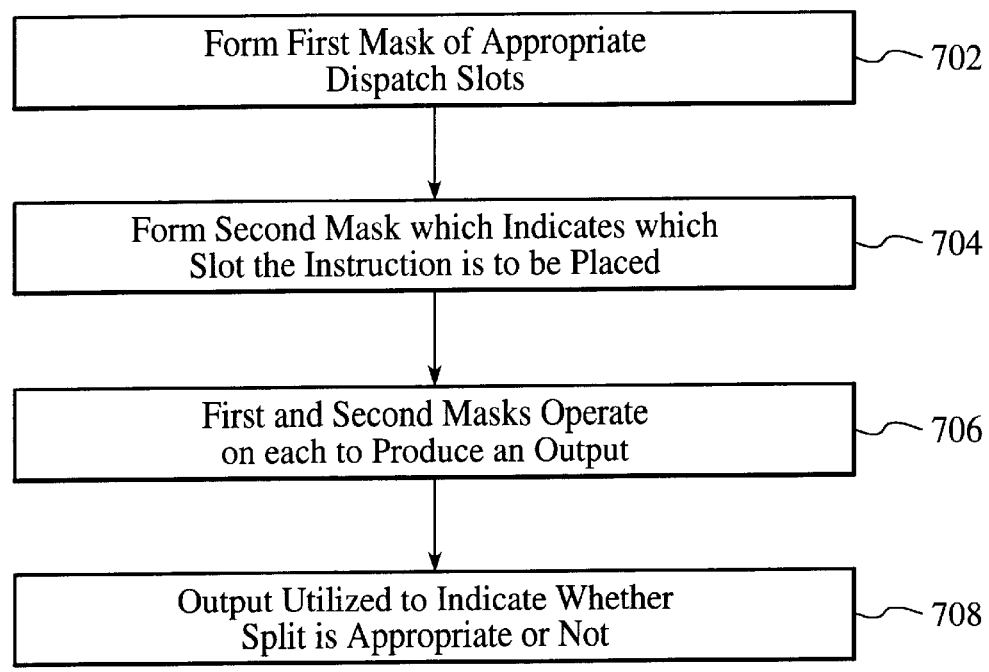
FIG. 7 is a flow diagram of the use of a conditional split bus alignment of IOPs to specific dispatch slots.

Instructions are assigned in dispatch slots in the processor based on the predecode information therewithin. For example, branch instructions are assigned the last dispatch slot. Instructions which require dispatch to a particular unit can be conditionally expanded into some number of no operations (NOPs) and the appropriate functional IOP, such that the IOP is dispatched to the appropriate functional unit. FIG. 7 is a flow diagram of the use of a conditional split bus alignment of IOPs to specific dispatch slots. A first mask of appropriate dispatch slots is formed, via step 702. Next, a second mask which indicates which slot the instruction is currently to be placed is formed, via step 704. These two masks operate on each other to produce an output, via step 706. This operation in a preferred embodiment is an inversion of the first mask and a bitwise ANDing of the inverted first mask with the second mask. The output of this operation can be used to indicate whether the instruction should be split or not, via step 708. Accordingly, if the result of the ANDing is a mask of all zeroes, then the instruction can proceed to the slot at which it is directed. However, if the resultant mask is not all zeroes, then the particular instruction does not belong in the particular dispatch slot, and the instruction is split to attempt to place the instruction in the appropriate dispatch slot. Accordingly, by splitting the IOP the instruction is expanded into at least one no operation (NOP) and an IOP, whenever the instruction would not normally fall within the slot which supports the instruction. In so doing the IOP has a better possibility of being in the proper dispatch slot.

For example: If a processor has a four-wide dispatch window and only odd slots are capable of division and only even slots are capable of multiplication, the following sequence of instructions would be decoded as shown in FIG. 8.

Accordingly, this process can be modified to allow a plurality of types of instructions to be supported for each of the dispatch slots. In addition, routing controls can be utilized to provide placement of instruction in the appropriate dispatch slots without requiring a new dispatch group.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method aligning internal operations (IOPs) for dispatch comprising:

conditionally asserting a predecode based on a particular dispatch slot that an instruction is going to be placed; and using the information related to the predecode in a masking operation to expand an instruction into at least one dummy operation and an IOP operation whenever the instruction would not be supported in the particular dispatch slot.

2. The method of claim 1 further comprising supporting a plurality of types of instructions for each of a plurality of the dispatch slots.

3. The method of claim 2 placing the plurality of the instructions in proper dispatch slots without requiring a new dispatch group to be formed by utilizing routing controls.

4. The method of claim 1 wherein the step of using the information related to the predecode in a masking operation further comprises forming a first mask of appropriate dispatch slots and forming a second mask which indicates which dispatch slot the instruction is going to be placed.

5. The method of claim 4 further comprising inverting the first mask and performing a bitwise logical AND operation of the inverted first mask and the second mask.

* * * * *